(12) United States Patent
Sasaki

(10) Patent No.: US 6,244,179 B1
(45) Date of Patent: Jun. 12, 2001

(54) RECORDING APPARATUS

(75) Inventor: Yoshiharu Sasaki, Shizuoka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/536,320

(22) Filed: Mar. 27, 2000

(30) Foreign Application Priority Data

Mar. 31, 1999 (JP) ................................... 11-093093
May 28, 1999 (JP) ................................... 11-150166

(51) Int. Cl.$^7$ ............................. B41F 27/00; B41F 35/00
(52) U.S. Cl. ...................... 101/401.1; 101/425; 101/483; 101/382.1; 347/203
(58) Field of Search ............................. 101/389.1, 423, 101/425, 463.1, 483, 486, 401.1, 382.1, 383; 400/55; 347/224, 263; 430/395

(56) References Cited

U.S. PATENT DOCUMENTS

| | | | |
|---|---|---|---|
| 3,358,598 | * 12/1967 | Middleton | 101/401.1 |
| 4,395,946 | * 8/1983 | Price | 101/401.1 |
| 4,872,407 | * 10/1989 | Banke | 101/401.1 |
| 5,259,311 | * 11/1993 | McCaughey, Jr. | 101/401.1 |
| 5,865,121 | * 2/1999 | Testardi et al. | 101/483 |
| 6,024,019 | * 2/2000 | Williams et al. | 101/425 |
| 6,085,653 | * 7/2000 | Goovaard et al. | 101/382.1 |
| 6,180,325 | * 1/2001 | Gelbart | 430/395 |

* cited by examiner

*Primary Examiner*—Eugene Eickholt
(74) *Attorney, Agent, or Firm*—Sughrue, Mion, Zinn, Macpeak & Seas, PLLC

(57) ABSTRACT

It is one objective of the present invention to precisely bring into contact with a recording drum or an image receiving sheet a adhesive roller that can remove dust therefrom, so as to prevent recording failures that occur because of dust that interferes with the proper adhesion of image receiving sheets and toner sheets. According to the invention, a recording apparatus comprises: a recording drum, to which an image receiving sheet is secured; a recording head; a step portion, which is provided on the recording drum to avoid an adverse affect resulting from the thickness of the image receiving sheet; and a adhesive roller, which has a stepped portion corresponding to the step portion on the recording drum and which is located near the recording drum for cleaning the surface of the recording drum and the surface of an image receiving sheet that is secured to the recording drum.

19 Claims, 13 Drawing Sheets

FIG. 17

| | CLEANING OF DRUM SURFACE | VACUUM SUCTION DURING CLEANING | CLEANING OF IMAGE RECEIVING SHEET | RESULTS | |
|---|---|---|---|---|---|
| | | | | WHITE RING COUNT FOUND ON SIZE A2. | BLANK AREA |
| COMPARISON EXAMPLE A | NO | NO | NO | 26 | 15 |
| COMPARISON EXAMPLE B | USE STICKY ROLLER WITH NO STEP PORTION | | | 25 | 11 |
| EMBODIMENT A | USE STICKY ROLLER WITH STEP PORTION | | | 20 | 9 |
| EMBODIMENT B | | YES | USE STICKY ROLLER WITH NO STEP PORTION | 7 | 6 |
| EMBODIMENT C | | | USE STICKY ROLLER WITH STEP PORTION | 5 | 4 |

RECORDING APPARATUS

BACKGROUND OF THE INVENTION

1. Field of the Invention

The present invention relates to a recording apparatus, and relates in particular to a recording apparatus that cleans a recording drum or an image receiving sheet by removing foreign substances therefrom.

2. Description of the Related Arts

A recording apparatus according to the present invention fixes to a recording rotary drum (hereinafter referred to as a recording drum), or to a recording plane, a recording medium (a general term used for an image receiving sheet that is fixed to a recording drum, and a toner sheet that is fixed to and covers the image receiving sheet), and records an image on the recording medium by irradiating it with a laser beam emitted by an optical head.

FIG. 13 is a schematic diagram illustrating the overall recording apparatus according to the present invention.

In FIG. 13, in order to produce a full-color image, a recording apparatus 30 comprises: a recording medium supply unit 32; a recording drum 34; a recording medium holding/releasing mechanism 36, which is provided on the recording drum 34; a laminating mechanism 38, arranged externally around the recording drum 34; an exposure head 40; a peeling mechanism 42; a paper supply unit 44; a laminating unit 46; a fixing unit 48; a separation unit 50; a tray unit 52; and a controller 54.

The recording apparatus 30 feeds an image receiving sheet R and a toner sheet T from the recording medium supply unit 32 to the recording drum 34. The recording medium holding/releasing mechanism 36 then fixes the image receiving sheet R to the recording drum 34, following which the laminating mechanism 38 applies thermal pressure to laminate the toner sheet T and the image receiving sheet R. Depending on the type of recording medium used, this heat lamination process may not be required.

Then, a latent image is formed on the toner sheet T by irradiating the recording medium with a heat mode laser beam emitted by the exposure head 40, which is operated, in consonance with an image signals, by the controller 54. Following this, the peeling mechanism 42 separates the toner sheet T from the image receiving sheet R on the recording drum 34 and the latent image on the toner sheet T is transferred to and developed on the image receiving sheet R.

This process is repeated several times to transfer three or four colors, and after a color image has finally been formed on the image receiving sheet R, the laminating unit 46 presses a paper sheet H, which is supplied from the paper supply unit 44, and the image receiving sheet R together so that they adhere to each other. Following this, the fixing unit 48 optically cures an image receiving layer 66 on the image receiving sheet R and the separation unit 50 removes the image receiving sheet R from the paper sheet H. Then, the paper sheet H, to which the full-color image is fixed, is output to a proof tray 52a, while the used image receiving sheet R is discharged to a waste stacker 52b.

In this manner, a full-color, hard copy of the image can be obtained.

The recording medium supply unit 32 comprises: a recording medium station 53, for holding recording medium stock (i.e., a roll of image receiving sheet R stock, and a plurality of rolls of photosensitive toner sheet T stock in such standard colors as black (K), cyan (C), magenta (M) and yellow (Y), or in special colors such as the gold and silver that are used in the printing industry); a pair of feed rollers 54, for feeding one type of recording medium stock; a cutter 55, for cutting the recording medium stock to form a sheet after the feed rollers 54 have extracted a specified length of stock from the recording medium station 53; a pair of rollers 56, for holding and transporting the thus formed recording sheet; and a guide 57, along which the recording sheet is conveyed, toward the recording drum 34, until the leading end of the recording medium reaches a fixed position at the recording medium holding/releasing mechanism 36, which is attached to the recording drum 34.

An image receiving sheet R is supplied first to the recording drum 34, and its leading edge is secured by clamps that constitute part of the recording medium holding/releasing mechanism 36. Then, an image receiving sheet R is fitted around the recording drum 34, as it rotates in the direction indicated by an arrow, so that the trailing edge can also be secured by the mechanism 36. At this time, it is preferable that at the least either the leading end fixing portion or the trailing edge fixing portion of the recording medium holding/releasing means 36 be permitted to slide along the outer surface of the recording drum 34, so that recording sheets of various lengths can be accommodated by the recording drum 34.

Following this, in the same manner as is described above, a toner sheet T, which is obtained from the recording medium supply unit 32, is fitted around the recording drum 34 and is laminated with the image receiving sheet R that was previously positioned around the outer surface of the recording drum 34. The lamination of the toner sheet T and the image receiving sheet R is performed by a laminating roller 58, which incorporates a heater (not shown); an arm 59, which pivots at a fulcrum 59a and which moves and positions the laminating roller 58 so that it contacts the outer surface of the recording drum 34 or is moved away from the surface of the recording drum 34; and pressing means 60, which applies a predetermined pressure to force the laminating roller 58 against the outer surface of the recording drum 34. The pressing means 60 is urging means, such as a spring, and may be an operator for an air cylinder.

Since an adhesive coating is applied to the outermost image receiving layer 66 of the image receiving sheet R, the toner sheet T can be applied to and laminated with the sheet R by employing the predetermined pressing force to hold the laminate roller 58 against the sheets. As a result, no creases are formed in the toner sheet T, and the image receiving layer on the image receiving sheet R closely and uniformly adheres to a toner layer on the toner sheet T.

In this case, the laminating roller 58 is used to laminate the toner sheet T and the image receiving sheet R because the sheets must uniformly adhere to each other. However, in order to increase the strength of the adhesion established between the sheets, it is preferable that, in addition to the pressure applied by the laminating roller 58, a thermal lamination process be performed. The temperature used should be equal to or lower than 130° C., and preferably should be equal to or lower than 100° C.

In addition, when the image receiving sheet R is to be positioned around the recording drum 34, it is preferable that the leading edge of the image receiving sheet R be secured by the recording medium holding/releasing mechanism 36, and that the other portion of the sheet R be held by the feed roller pair 56, the laminating roller 58 or another means, so that a predetermined tension is applied to the image receiving sheet R. In this case, as will be described later, suction holes may be formed around the outer surface of the recording medium 34, and suction applying means may be used to produce a suction effect that holds the image receiving sheet R against the surface of the recording drum 34 (see FIG. 14). While it is preferable that the suction means and the recording medium holding/releasing mechanism 36 be employed together, each of them can be employed individually. As a result, the image receiving sheet R can be secured to the outer surface of the recording drum 34 without any creases being formed in it and without its position being shifted during the process. It is also preferable that tension be applied to the toner sheet T when it and the image receiving sheet R are laminated. In the same manner as when the image receiving sheet R is positioned, the recording medium holding/releasing mechanism 36 may be employed to secure the leading edge and/or the trailing edge of the toner sheet T, or it and the above described suction means may be employed together. It should be noted that, preferably, less tension is applied to a toner sheet T during the lamination process than is applied to an image receiving sheet R when it is positioned around the recording drum 34.

The exposure head 40 comprises modulation means; a laser head 24, which includes a laser beam source that emits a high-density energy beam (a laser beam), and an image focusing lens, for adjusting the diameter of the spot produced by a laser beam; and secondary scanning means 61, for moving the laser head 24 in the axial direction of the recording drum 34 (direction vertical to the paper surface in FIG. 1) to perform secondary scanning.

The primary scanning of the toner sheet T, for which a laser beam is used, is performed by the rotation of the recording drum 34. And instead of the secondary scanning means 61 being provided for the exposure head 40, moving means for displacement in the axial direction may be provided for the recording drum 34, and the secondary scanning may be performed and move the recording drum 4 at the same time it is being rotated for the primary scanning.

The laser beam source need only emit a high-density energy beam that enables heat mode exposure, and can be, for example, a gas laser, such as an argon ion laser, a helium neon or a helium cadmium laser, a solid-state laser such as a YAG laser, a semiconductor laser, a color laser, or an excimer laser. Modulation of a laser beam in accordance with an image signal is performed by a well known method, such as a method for transmitting a laser beam to an external modulator when an argon laser is employed as a laser beam source, or a method for using a signal to control (directly modulate) a current that flows to a laser when a semiconductor laser is employed as the laser beam source. The size of a laser spot focused on a photo-thermal conversion layer, and the scanning speed are determined in accordance with the resolution required for an image and the recording sensitivity of the scanned material. For printing, generally a high resolution is required, and for image quality a small beam spot is preferable. However, the focusing depth is short and providing efficient mechanical control is difficult. In addition, when the scanning speed is reduced to a point at which it is too low, heat loss due to the conduction of heat to the toner support member is increased, the energy efficiency is deteriorated, and the recording time is extended. From this it has been concluded that for this invention the recording conditions should be: a beam spot on the photo-thermal conversion layer of 5 to 50 $\mu$m, preferably 6 to 30 $\mu$m, and a scanning speed of 1 m per second or higher, preferably 3 m per each second or higher.

An image signal from an external image reader for the recording apparatus 30, from an image processor, from a workstation (W/S) having a DTP function, from an electronic publishing system, or from various storage media (a magnetic tape, a floppy disk, a hard disk, a RAM card, etc.) is transmitted to the controller 54, via an interface, as a digital signal. Necessary processing is performed for the image signal, and the resultant image signal is transmitted to the exposure head 40 to provide control for the head mode exposure process performed by the laser head 24.

The controller 54 controls the secondary scanning performed by the secondary scanning means 61 of the exposure head 40 and the rotation of the recording drum 34 for primary scanning, and also controls the operation of the individual sections of the recording apparatus of this invention as well as all functions performed during the processing sequence.

The peeling mechanism 42 separates, from the image receiving sheet R, the toner sheet T on which a latent image has been formed by the heat mode exposure process performed by the exposure head 40, and at the same time transfers the latent image from the toner sheet T to the image receiving sheet R for development. The peeling mechanism 42 includes: a separation roller 62; two division rollers 63 and 64, which abut upon the separation roller 62; a comb-toothed guide plate 65, which is located along the separation roller 62 and between the division rollers 63 and 64; and a bracket (not shown) on which these integrally provided components are mounted. The separation roller 62 is supported by an arm 67, and pivots at a fulcrum 67a so that it can brought into contact with or separated from the recording drum 36. In addition, pressing means 68 is provided that employs the arm 67 to press the separation roller 62 against the laminated image sheet R and toner sheet T on the recording drum 34.

After thermal energy has been applied during the heat mode exposure process, and a latent image has been formed on the toner sheet T by reducing the adhesive strength of the toner layer 22, the arm 67 is rotated at the fulcrum 67a and the bracket is brought in contact with the lamination of the toner sheet T and the image receiving sheet R on which is deposited the image receiving layer 66. Then the comb-toothed guide plate 65 is inserted between the image receiving layer 66 on the image receiving sheet T and the toner layer 22 on the toner sheet T, and from the tone sheet T side, pressure is applied to the laminate by the separation roller 62. If the length of either the toner sheet T or the image sheet R has changed, the comb-toothed guide plate 65 can be easily inserted between the two. Following this, as the recording drum 34, as well as the separation roller 62 and the division rollers 63 and 64, is rotated the leading edge of the toner sheet T is moved along the comb-toothed guide 65 until it is held between the separation roller 62 and the division roller 63. The toner sheet T, to which pressure is applied by the separation roller 62, is transported while sandwiched between the separation roller 62 and the division rollers 63 and 64 until it is finally separated from the image sheet R. Since the toner sheet T can be separated at a constant speed at the portion to which pressure is applied by the separation roller 62, a constant force can also be-applied for peeling, so that a phenomenon such as stick slipping does not occur and uniform peeling can be performed. Furthermore, since the separation force applied to the image receiving sheet R does not vary, the image receiving sheet R held in a fixed position on the recording drum 34 and is not shifted. Accordingly, deterioration of the alignment accuracy does not occur. As a result, a single-color, gray scale dotted image, having a high image quality and a high resolution, can be obtained for which peeling is performed uniformly and for which no alignment shifting occurs.

The image receiving sheet R, on which images of C, M, Y and K colors are precisely aligned and for which separation, transferring and developing have been performed, is fed by a transfer roller pair 71 along guide members 70 to the laminating unit 46.

At the laminating unit 46, as the image receiving sheet R is fed in, a main sheet H from a paper cassette 73 is supplied by a paper supply roller 72 and is fed along the guide member 70 on the left in FIG. 13. The main sheet H may also be fed to the paper supply roller 72 through a manual supply port 44a. Then, the image receiving sheet R and the main sheet H are positioned and laminated by a resist roller pair 75, and the laminate is transferred to the fixing unit 48.

The laminating unit 46 may be provided separately from the recording apparatus 30.

In the fixing unit 48, the image receiving sheet R and the main sheet H, which have been laminated by the laminating unit 46, are thermally secured to each other by a thermal fixing roller pair 76 consisting of a pressing roller 76a and a heating roller 76b. The sheet laminate is fed between the rollers 76, and is cured by a post-exposure lamp 77, such as an ultraviolet lamp, so that the image receiving layer 66 on the image receiving sheet R can be easily separated from the sheet H.

Depending on the recording medium type, the fixing process may not be required.

Next, at the separation unit 50, the image receiving layer which has been cured and is ready to be separated, is peeled off the image sheet R by a separation roller pair 78 and a separation guide 79, and by adhering to the main sheet H transfers the image to it. Subsequently, the image bearing sheet H is output as hard copy to the proof tray 52a of the tray unit 52, while the image receiving sheet R, from which the image receiving layer 66 has been separated, is discharged to the waste tray 52b.

As is described above, the recording apparatus 30 in FIG. 13 fixes a recording medium to the recording drum 34 for printing. However, since the recording drum 34 rotates at a comparatively high speed during the recording process, sometimes the recording medium may be lifted away from the recording drum 34, and shifted or curled.

In order to prevent this, a suction device shown in FIG. 14 is used to hold the recording medium. FIG. 14A is a conceptual cross-sectional view of this suction device, and FIG. 14B is a perspective view of the surface of a recording drum in which multiple suction holes have been formed.

In FIGS. 14A and 14B, the suction device comprises: a recording drum 11, suction holes 142, rotary shaft holes 143, a suction pipe 144 and an air blower 145. The multiple suction holes 142 are radially formed in the recording drum 34 within an area to which a recording medium 10 is fixed. The recording drum 11 is hollow, and the multiple rotary shaft holes 143 are formed in the rotary shaft. The recording drum 11 is connected via the suction pipe 144 to the air blower (or a vacuum pump) 145, which is an external suction source. While the size of suction holes 142 is exaggerated in the drawings so that they can more easily be seen, in actuality, more and smaller holes are formed.

When the air blower 145 begins to produce suction, air from the recording drum 11 is drawn into the suction pipe 144, and the internal pressure of the recording drum 11 is thereby reduced. Thus, the recording medium 10 is drawn to and securely held on the surface of the recording drum 11 by the vacuum effect established by the suction of air through the multiple suction holes 142.

More specifically, as previously described, the recording medium 10 consists of the image receiving sheet R and the toner sheet T. And first, when the image receiving sheet R is positioned on the recording drum 11, it is held there by the vacuum effect produced by the suction of air through the arrangement of multiple suction holes 142 under it. Then, when the toner sheet T is placed over the image receiving sheet R, since the toner sheet T is cut so that it is larger than the image receiving sheet R, portions of it extend outward, on all four sides, beyond the edges of the image receiving sheet R, and are attracted by the vacuum at the multiple suction holes 142 that lie under them. As a result, the toner sheet T is also fixed to the recording drum 11.

In this case, when the toner sheet T covers the image receiving sheet R, creases may be formed at the ends of the toner sheet T due to the thickness of the image sheet R. Since such creases adversely affect the recording process, the formation of creases must be prevented.

Therefore, as will be described later, a step portion is provided for the recording drum 11 by (1) attaching step tape to the surface of the recording drum 11, or (2) by forming a groove in the surface of the recording drum 11, and the height of the step portion is set so that it is substantially equal to the thickness of the image receiving sheet R. Then, when the toner sheet covers the image receiving sheet, no creases are formed at the ends of the toner sheet. In this case a recording drum 11 is employed on which, to prevent the formation of creases, a step portion can be formed by attaching step tape to or by forming a groove in the surface.

The attachment of dust, which can result in a recording failure, still constitutes a problem for such a recording apparatus. There are two types of recording failures that occur due to the attachment of dust:

(1) a recording failure that occurs when dust is attached to the image receiving sheet (occurrence of a so-called blank area); and (2) a recording failure that occurs when dust is attached to the recording drum (occurrence of a so-called blank ring).

FIG. 15 is a diagram for explaining the reason for the occurrence of a blank area recording failure (1).

In FIG. 15, an image receiving sheet R is fixed to the surface of the recording drum (hatched portion), the toner sheet T is fixed thereto, and dust X is trapped between the sheets R and T.

When dust X is present on the image receiving sheet R, an adhesion failure due to the dust X occurs between the toner sheet T and the image receiving sheet R, and an image nonexistent area (a so-called blank area) occurs spanning a range A described by an arrow A.

FIG. 16 is a diagram for explaining the reason that a recording failure (2), a blank ring, occurs. In this case, when an image receiving sheet R and a covering toner sheet are fixed to the surface of the recording drum (hatched portion), dust X is trapped between the recording drum and the image receiving sheet R.

When dust X is present on the recording drum, the image receiving sheet R, which is strongly attracted by the vacuum produced at multiple suction holes, assumes a shape resembling that of the dust X. However, the vacuum produced attraction affecting the toner sheet T is strong only at the portions that overlap the image receiving sheet R, and is weak and has little effect on the toner sheet T at the location of the dust X. In this case, since the toner sheet T is rigid to a degree, a ring-shaped gap C is formed between the toner sheet T and the image receiving sheet R in the area surrounding the dust X, even though at the center of the area in which the dust X is located the toner sheet T and the image receiving sheet R closely adhere to each other. Therefore, because of this gap C the image can not be transferred, and a blank, ring-shaped band (a so-called blank ring) is produced within the range described by an arrow B.

Further, because of the misalignment of the image receiving sheet R and the toner sheet T that is caused by the dust X, the point of focus of a recording laser beam L is shifted, a satisfactory energy intensity can not be obtained, an image is tapered off across the range described by the arrow B, and the image density image is reduced, resulting in the production of a coarse image.

To resolve this problem, a roller having a more adhesive surface (hereinafter referred to as an adhesive roller) is employed as the laminating roller 58 in FIG. 13. As the adhesive roller is rotated, the portion in contact with the image receiving sheet R removes dust therefrom.

But when such a adhesive roller was employed to remove dust from an image receiving sheet R positioned on a conventional recording drum to which step tape was attached, the following problem was encountered.

FIG. 11A or 11B is a front cross-sectional view and a side sectional-view of provided for a recording drum 1 on which is mounted step tape 3. In FIG. 11A, an image receiving sheet 4 is fed to and fixed on the recording drum 1. In FIG. 11B, a toner sheet 5 is fed the recording drum 1 and secured to the image receiving sheet 4 in FIG. 11a.

Generally, the external width of the image receiving sheet 4 is smaller than the internal width of the step tape 3, and the external width of the toner sheet 5 is greater than that of the image receiving sheet 4, in order to increase the adhesive strength between it and the image receiving sheet 4.

In FIG. 11, a adhesive roller 2 is located near, and step tape 3 is attached to the recording drum 1, which is rotated so that the recording medium (i.e., the image receiving sheet and the toner sheet) can be fitted around it. The adhesive roller 2 is located near the recording drum 1, so that it can contact the image receiving sheet 4, and two lengths of the step tape 3, are attached, in the rotational direction, around the left and right portions of the outer surface of the recording drum 1, and two more lengths are extended, in the axial direction, near the ends of the first two lengths. During the image recording process, the image receiving sheet 4 is fed to the recording drum 1 and is secured to the area defined by the inner side of the step tape 3 (the inner side of the step tape 3 delineates an area between steps, i.e., an area enclosed by lengths of the step tape 3 that are attached in parallel, in the rotational direction, to the right and left portions of the outer surface of the recording drum 1 and are attached in parallel, in the axial direction, near both ends of the first lengths). The toner sheet 5, the size of which does not exceed the outer limits of the step tape 3, is fed to the recording drum 1 and adheres to the image receiving sheet 4 and the step tape 3.

As the adhesive roller is rotated in contact with the image receiving sheet 4, dust is removed from the image receiving sheet 4.

As is shown in FIG. 11A, the image receiving sheet 4 is fed to the rotating recording drum 1, and is positioned around and secured to the recording drum 1 while the adhesive roller 2 above the recording drum 1 follows the contours of the image receiving sheet 4.

Then, as is shown in FIG. 11B, the toner sheet 5 is fed to the recording drum 1, on which the image receiving sheet 4 is positioned, and is attached to the image receiving sheet 4 by a suction produced vacuum. At this time, if step tape 3 is not attached to the recording drum 1 or if the toner sheet 5 is longer than the outer size of the step tape 3, the height difference produced by the image receiving sheet 4 or the step tape 3 causes the end of the toner sheet 5 to be folded over so that a crease is formed in it and a uniform image can not be obtained. Therefore, the width and length of the toner sheet are larger than those of the image receiving sheet, but are smaller than those delineated the by outer size of the step tape.

A recording drum in which a groove is formed will now be described while referring to FIGS. 12A and 12B.

FIGS. 12A and 12B are a front sectional-view and a side sectional-view of a adhesive roller provided for a conventional recording drum 1 in which a groove is formed. In FIG. 12A, an image receiving sheet 4 is fed to and held on the recording drum 1, and in FIG. 12b, a toner sheet 5 is fed to and held on the image receiving sheet 4 in FIG. 12A.

In FIGS. 12A and 12B, a adhesive roller 2 is located near the recording drum 1, which is the same as the one shown in FIGS. 11A and 11B, with the exception that instead of step tape being attached to its surface, a groove is formed in it. An image receiving sheet 4 is fed to the groove and is secured therein, and a toner sheet 5 is fed to the recording drum 1 and adheres to the image receiving sheet 4. Using the groove, a step portion is formed on the recording drum 1.

Generally, the width of the image receiving sheet is smaller than the internal size of the groove, and the toner width is greater than the widths of the image receiving sheet and of the groove in the recording drum.

However, for a recording drum 1 to which step tape 3 is attached or in which a groove is formed, if the step tape is thicker than the image receiving sheet 4, or if the depth of the groove in the recording drum 1 is greater than the thickness of the image receiving sheet 4, i.e., if the image receiving sheet 4 is thinner than a predetermined thickness when the sheet is changed, dust can not efficiently be removed from the image receiving sheet 4 since the adhesive roller 2, which at both ends contacts the step tape 3 or the recording drum 1, does not uniformly contact the image receiving sheet 4. If the adhesive roller 2 and the recording drum 1 contact each other, even though the thickness of the step tape 3 (or the depth of the groove) is the same as that of the image receiving sheet, the force applied at the center portion is stronger than the force applied at the ends, so that the adhesive roller does not contact the image receiving sheet 4 evenly, and dust on the image receiving sheet 4 can not be uniformly removed.

Further, as is described above, while dust on an image receiving sheet can be removed by using the adhesive roller 2, dust on a recording drum 1 in which a step is formed can not removed by using the adhesive roller.

SUMMARY OF THE INVENTION

To resolve the above problems, it is one objective of the present invention to provide a recording apparatus that can precisely bring a adhesive roller into contact with a recording drum or an image receiving sheet, so that dust on the recording drum or on the image receiving sheet can be completely removed.

To achieve the objective, according to the invention a recording apparatus comprises:

a recording drum, to which an image receiving sheet can be fixed;

a recording head;

a step portion, which is provided for the recording drum to avoid an effect produced by the thickness of the image receiving sheet; and a adhesive roller for cleaning the surface of the recording drum.

According to the invention, the adhesive roller cleans the surface area of the drum that the image receiving sheet contacts.

According to the invention, the strength of the adhesive force exerted by the adhesive roller is equal to or greater than 8 hecto-pascals.

According to the invention, provided for the adhesive roller is a step portion that corresponds to the step portion on the recording drum.

According to the invention, a gap at the step portion in the axial direction of the adhesive roller is smaller than a gap at the step portion on the recording drum.

According to the invention, the recording apparatus further comprises:

a suction device for attracting a recording medium to and holding the recording medium on the recording drum, wherein multiple suction holes are radially formed in the recording drum, and wherein the suction device is activated after the adhesive roller has cleaned the surface of the recording drum.

According to the invention, the suction device is activated after the adhesive roller has cleaned the surface of the recording drum, and then the image receiving sheet is fixed to the recording drum and the adhesive roller cleans the surface of the image receiving roller.

According to the invention, the suction device is activated, and then the adhesive roller cleans the surface of the recording drum, the image receiving sheet is fixed, and the adhesive roller cleans the surface of the image receiving sheet.

According to the invention, a recording apparatus comprises:

a recording drum, to which an image receiving sheet is secured;

a recording head;

a step portion, which is provided for the recording drum to avoid an effect produced by the thickness of the image recording sheet; and an adhesive roller, which has a step portion and which is located near the recording drum, for cleaning the surface of the image receiving sheet that is secured to the recording drum.

According to the invention, the width, in the axial direction, of the face of the adhesive roller that contacts the image receiving sheet is substantially equal to the width, in the axial direction, of the image receiving sheet.

According to the invention, the width, in the axial direction, of the face of the adhesive roller that contacts the image receiving sheet is smaller narrower the width, in the axial direction, of the gap at the step portion in the recording drum.

According to the invention, the width, in the axial direction, of the face of the adhesive roller that contacts the image receiving sheet is narrower by at least 3 mm than the width, in the axial direction, of the gap at the step portion in the recording drum.

According to the invention, the width, in the axial direction, of the face of the adhesive roller that contacts the image receiving sheet is narrower by at least 3 mm than the width, in the axial direction, of the gap, in the axial direction, at the step portion in the recording drum, and is wider, in the axial direction, than the width, in the axial direction, of the image receiving sheet.

According to the invention, the width, in the axial direction, of the face of the adhesive roller that contacts the image receiving sheet is substantially equal to the width, in the axial direction, of the recording range for the image receiving sheet.

According to the invention, the width, in the axial direction, of the face of the adhesive roller that contacts the image receiving sheet is narrower than the width, in the axial direction, of the gap at the step portion in the recording drum, and is wider than the width, in the axial direction, of the recording range for the image receiving sheet.

According to the invention, a recording apparatus comprises:

a recording drum, to which an image receiving sheet is secured;

a recording head;

a step portion, which is provided for the recording drum to avoid the effect produced by the thickness of the image recording sheet;

an adhesive roller, which has a step portion and which is located near the recording drum to clean the surface of the recording drum; and an adhesive roller, which has a step portion and which is located near the recording drum to clean the surface of the image receiving sheet.

According to the invention, the adhesive roller used for cleaning the recording drum, and the adhesive roller used for cleaning the image receiving sheet are employed together.

According to the invention, a recording plane is employed instead of the recording drum.

According to the invention, said adhesive roller is disposed close to said recording drum

BRIEF DESCRIPTION OF THE DRAWINGS

FIG. 17 is a table showing the results obtained by experiments performed using the apparatus of the present invention and using the conventional apparatus.

DETAILED DESCRIPTION OF THE PREFERRED EMBODIMENTS

The present invention will now be described while referring to FIGS. 1 to 10.

Figure 1:
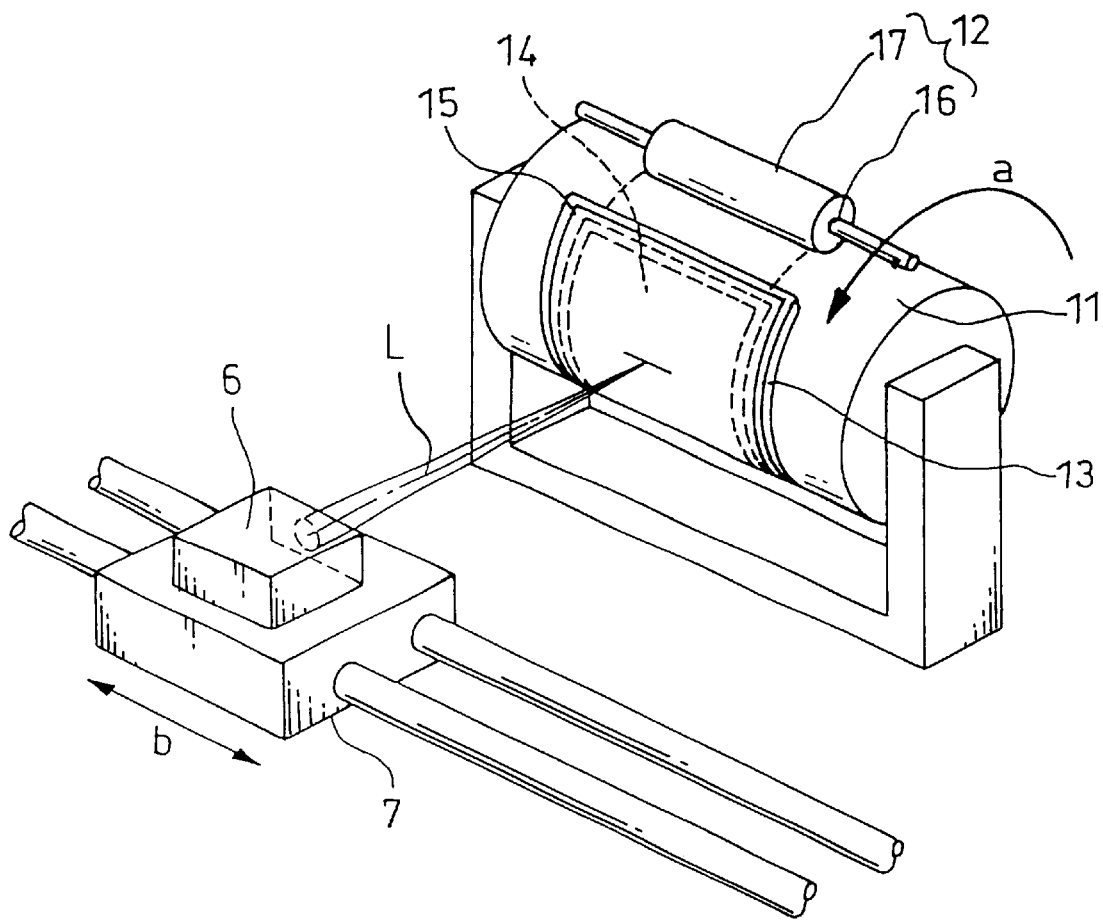
FIG. 1 is a perspective view of an example recording apparatus according to the present invention.

In FIG. 1, a recording apparatus comprises: an optical head 6, for projecting a laser beam in consonance with image data; a movable stage 7, for moving the optical head 6 that is mounted thereon; a recording drum 11, around which an image receiving sheet 14 that is irradiated by the laser beam is fitted and secured; an adhesive roller 12, which is located near the recording drum 11 to remove dust from the image receiving sheet 14; and the image receiving sheet 14 and a toner sheet 15 that are irradiated by the optical head 6. Lengths of step tape 13 are extended, in the rotational direction, around the right and left portions of the external surface of the recording drum 11, and other lengths of the step tape 13 are extended, in the axial direction, near the ends of the first lengths. The image receiving sheet 14 is secured inside the step tape 13, and the toner sheet 15 is secured to the external surface of the step tape 13. As previously described, a recording drum 11 may be employed for which a groove is used instead of the step tape 13. These two recording drums are generally called "recording drums having a step portion."

The recording apparatus feeds an image receiving sheet 14 and a toner sheet 15 in the feeding direction indicated by an arrow a in FIG. 1, exposes these sheets to a laser beam emitted by the optical head 6 that moves in a direction (indicated by an arrow b) substantially perpendicular to the feeding direction, and in consonance with image data, transfers a toner image on the toner sheet 15 to the image receiving sheet 14. During or before this image recording, the adhesive roller 12 of the present invention is brought into contact with the image receiving sheet 14 and rotated to remove dust therefrom.

Further, before the image receiving sheet 14 is secured to the recording drum 11 with a step portion, the adhesive roller 12 is also brought into contact with the recording drum 11 and rotated to remove dust therefrom.

The recording apparatus of the presents invention has the following two modes.

1) In a first embodiment, instead of a conventional adhesive roller that has no step portion, an adhesive roller having a step portion is employed to efficiently remove dust from the image receiving sheet 14.
2) In a second embodiment, before an image receiving sheet 14 has been secured to a recording drum, an adhesive roller is employed to remove dust from the recording drum.

Figure 2:
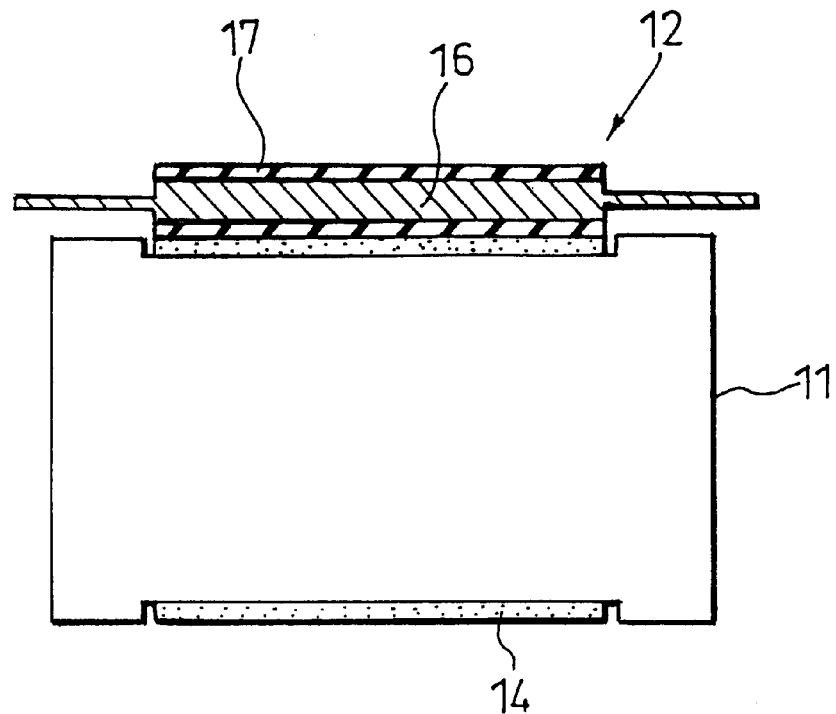
FIG. 2 is a front cross-sectional view of a recording apparatus, for which a groove is used, that includes a first example adhesive roller according to a first embodiment of the present invention.

FIG. 2 is a front cross-sectional view of the recording drum 11 with a groove according to the first embodiment, for which a first example adhesive roller 12 is provided. In FIG. 2, the adhesive roller 12 is so designed that the width, in the axial direction, of a sticky rubber layer 17 and the width of the largest diameter portion of a metal core 16 are substantially equal to the width, in the axial direction, of the image receiving sheet 14.

Figure 3:
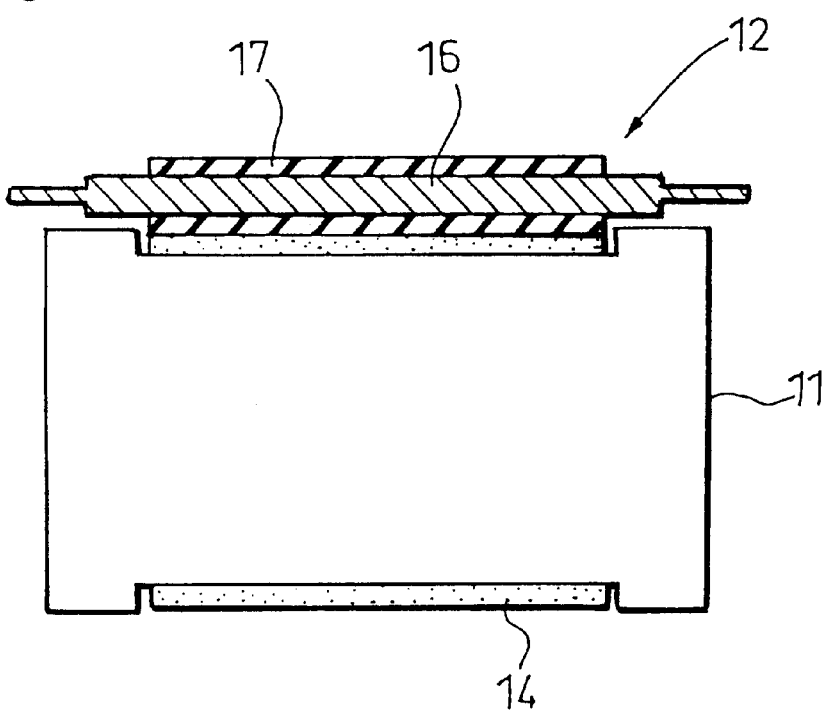
FIG. 3 is a front cross-sectional view of the recording apparatus, for which a groove is used, that includes a second example adhesive roller according to the first embodiment of the present invention.

FIG. 3 is a front cross-sectional view of the recording drum 11 with a groove according to the first embodiment, for which a second example adhesive roller 12 is provided. In FIG. 3, the adhesive roller 12 is so designed that the width, in the axial direction, of a sticky rubber layer 17 is substantially equal to the width, in the axial direction, of the image receiving sheet, and the width, in the axial direction, of the largest diameter portion of a metal core 16 is greater than the width of the rubber layer.

Figure 4:
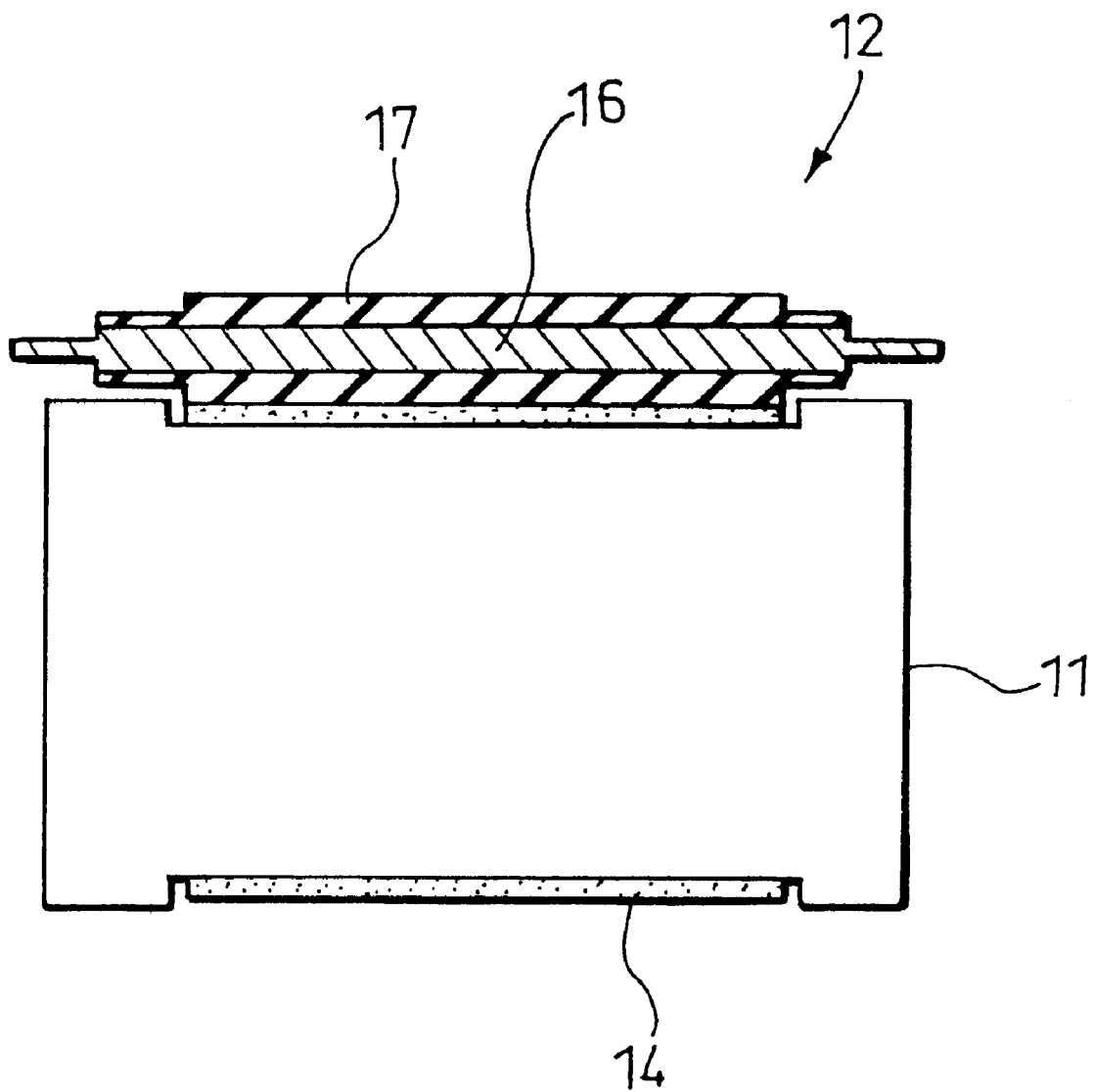
FIG. 4 is a front cross-sectional view of the recording apparatus, for which a groove is used, that includes a third example adhesive roller according to the first embodiment of the present invention.

FIG. 4 is a front cross-sectional view of the recording drum 11 with a groove according to the first embodiment, for which a third example adhesive roller 12 is provided. In FIG. 4, the adhesive roller 12 is so designed that all of the largest diameter portion of a metal core 16 is covered with sticky rubber, but the width, in the axial direction, of a thick rubber portion that contacts the image receiving sheet is substantially equal to the width, in the axial direction, of the image receiving sheet.

The same reference numerals are employed to denote corresponding components in FIGS. 1 to 4.

The material used for the adhesive roller 12 can be a sticky rubber composition that contains TiOx (titanium oxide) and does not contain Ba (barium). Or, a sticky rubber composition that contains a hydrocarbon compound that includes a C—O or Si—O functional group, or a sticky rubber composition that contains TiOx (titanium oxide) and a hydrocarbon compound that includes a C—O or Si—O functional group may be employed. In this case, the sticky rubber composition should not contain Ba.

In FIGS. 2 to 4, an adhesive roller (or a squeeze roller) 12 is located near the recording drum 11 to remove dust from the image receiving sheet 14. During the image recording process, the image receiving sheet 14 is fed to the recording drum 11 and is secured, and is cleaned by the adhesive roller 12. The adhesive roller 12 includes the metal core 16 and the sticky rubber layer 17 that is attached to the core metal 16, and employs the sticky rubber to remove dust from the image receiving sheet. In addition to the structures in FIGS. 2 to 4, various other structures can be employed for the adhesive roller 12, so long as the width, in the axial direction, of the portion of the adhesive roller 12 that contacts the image receiving sheet 14 is substantially equal to the width, in the axial direction, of the image receiving sheet 14. The width, in the axial direction, of the adhesive roller 12 is the width, in the axial direction of the adhesive roller, of the face of the image receiving sheet 14 that the adhesive roller contacts and from which it removes dust.

An explanation will now be given for the operation of the recording drum 11 for which the adhesive roller of one of the first to the third examples is provided. The operation of the recording drum 11 is the same as that of the conventional recording drum. First, an image receiving sheet 14 is fed to the recording drum 11 as it is being rotated. Then, while the image receiving sheet 14 is fitted around and secured to the recording drum 11, the adhesive roller 12, which is positioned above the recording drum 11, follows and rotates in unison with it. Dust is removed from the image receiving sheet 14 as it is moved while in contact with the adhesive roller 12. To secure the image receiving sheet 14 to the recording drum 11, the recording medium securing suction device is employed whereby air is removed from the interior of the recording drum 11, in which the previously described multiple suction holes are formed.

A squeeze roller other than an adhesive roller may be employed to fit the image receiving sheet around the recording drum and it may be cleaned by another adhesive roller.

When the image receiving sheet 14 has been secured, the toner sheet 15 is fed to the recording drum 11 and is positioned so that it covers the image receiving sheet 14. During this process, dust may be removed by the adhesive roller 12 in the same manner as was previously described. At this time, the suction device is employed to increase the attraction between the image receiving sheet 14 and the toner sheet 15.

When the image receiving sheet 14 and the toner sheet 15 have both been secured, a laser beam from the optical head 6 (FIG. 1) is projected to record image or character data on the recording medium. Then, the toner sheet 15 is separated from the image receiving sheet 14 and the image recording process is thereafter terminated. For color image recording using the colors K, C, M and Y, the above described image recording process is repeated following the K, C, M and Y color order.

Figure 5:
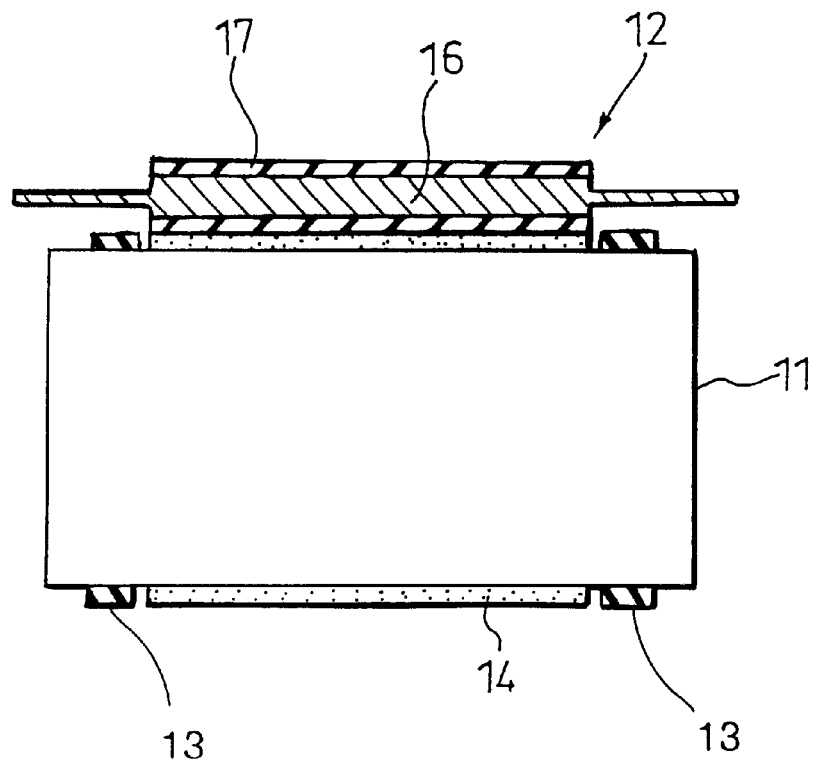
FIG. 5 is a front cross-sectional view of the recording apparatus, for which step tape is used, that includes the first example adhesive roller according to the first embodiment of the present invention.
Figure 6:
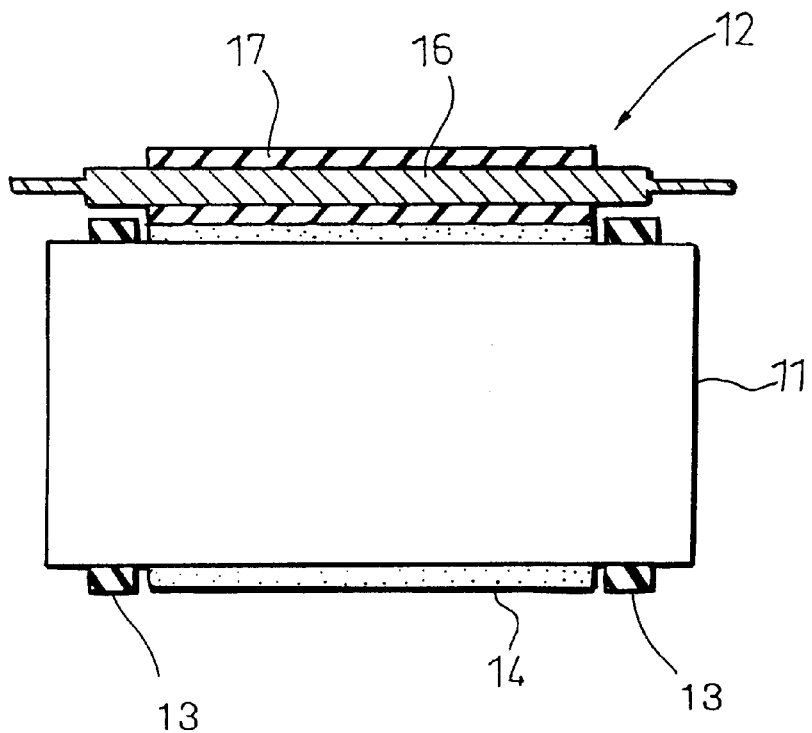
FIG. 6 is a front cross-sectional view of the recording apparatus, for which step tape is used, that includes the second example adhesive roller according to the first embodiment of the present invention.
Figure 7:
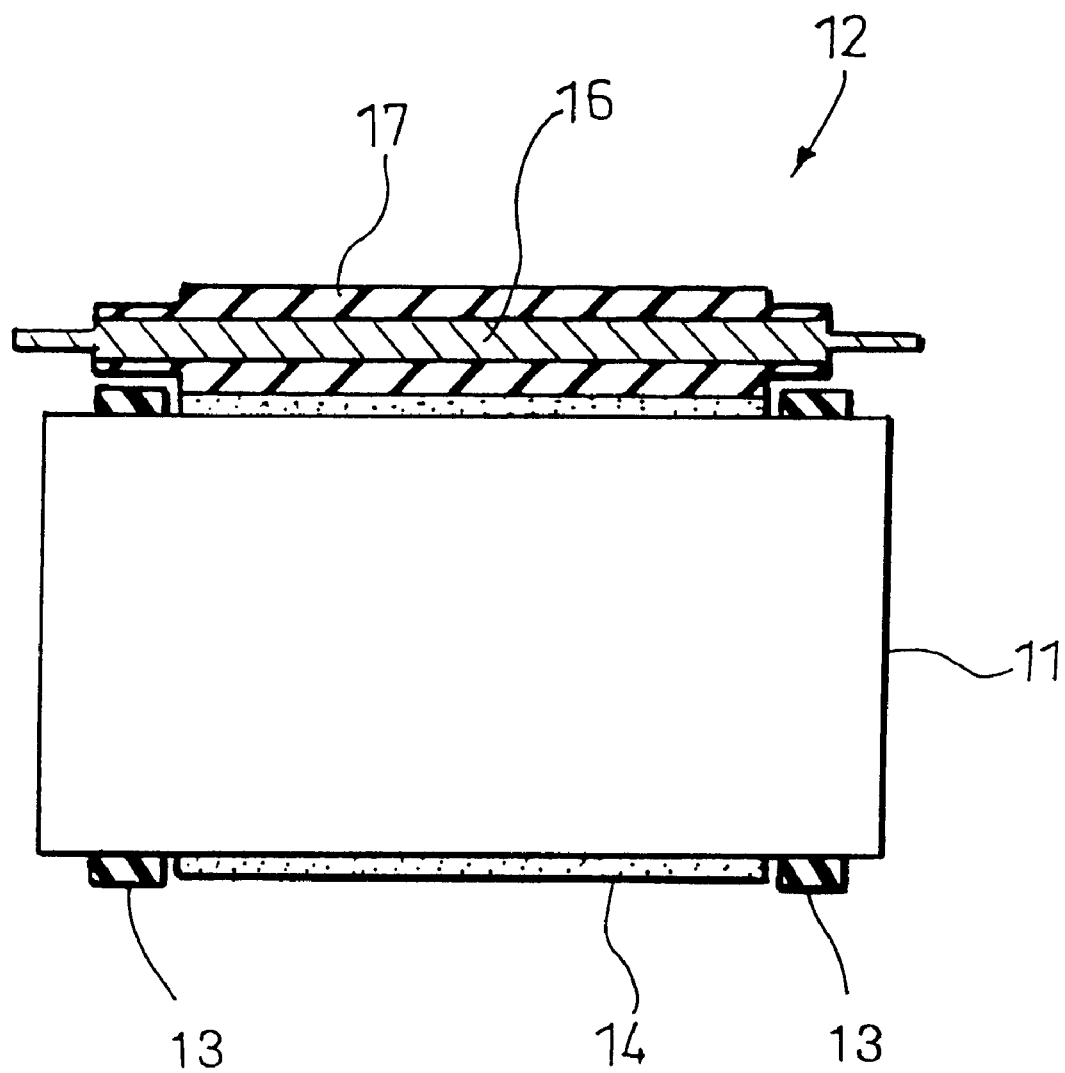
FIG. 7 is a front cross-sectional view of the recording apparatus, for which step tape is used, that includes the third example adhesive roller according to the first embodiment of the present invention.

The recording drum shown in FIGS. 5 to 7 differs from those in FIGS. 2 to 4 in that a step portion is attached to it, instead of a groove being formed in it. FIG. 5 is a front cross-sectional view of a recording drum 11, to which step tape 13 has been attached, for which an adhesive roller 12 is provided, and corresponds to the first example (FIG. 2) for the first embodiment. FIG. 6 is a front cross-sectional view of a recording drum 11 to which step tape 13 has been attached and for which an adhesive roller 12 is provided, and corresponds to the second example (FIG. 3) for the first embodiment. FIG. 7 is a front cross-sectional view of a recording drum 11, to which step tape 13 has been attached, for which an adhesive roller 12 is provided, and corresponds to the third example (FIG. 4) for the first embodiment. In the examples in FIGS. 5 to 7, the same reference numerals as used for the recording drum in which a groove is formed in FIGS. 2 to 4 are also used to denote corresponding components.

In FIGS. 5 to 7, an adhesive roller or a squeeze roller 12 is located near, and step tape 13 is attached to the recording drum 11, around which the image receiving sheet 14 is fitted and to which it is secured. The adhesive roller or the squeeze roller 12 is located near the drum 11, so that it can remove dust from the image recording sheet 14, and two lengths of the step tape 13 are attached, in the rotational direction, to the right and left portions of the outer surface of the recording drum 11 and two more length are attached, in the axial direction, near the ends of the first lengths of step tape 13. During the image recording process, the image receiving sheet 14 is fed to the recording drum 11 and secured to it, and dust is removed from the sheet 14 by the adhesive roller 12. The adhesive roller 12 includes the metal core 16 and the sticky rubber layer 17 that is applied to the metal core 16 and is used for removing foreign substances, such as dust, from the image receiving sheet 14. The structures used for the adhesive roller 12 are as shown in the examples in FIGS. 2 to 4; however, the structures that can be used for the adhesive roller 12 are not limited to those in these examples, and various other structures may be employed so long as the width, in the axial direction, of the portion of the adhesive roller that contacts the image receiving sheet 14 substantially matches the width, in the axial direction, of an image receiving sheet 14. With an adhesive roller 12 that is structured as shown, dust can be removed from the portion of the image receiving sheet 14 that is secured to the recording drum 11, without the step tape 13 being contacted.

The adhesive roller 12 in the first or the second example is employed when the image receiving sheet 14 is fed to the recording drum 11 and secured thereto inside the step tape 13 or at the center of the groove that is formed in the recording drum 11, without contacting the step tape 13 or the recording drum 11. However, the image receiving sheet 14 is not always fed to the center of the groove, and therefore, the mechanical size of the adhesive roller 12 is restricted in order to prevent it from contacting the step tape 13 or the recording drum 11.

While taking the limit imposed on the mechanical size into account, the recording apparatus includes an adhesive roller for which the width, in the axial direction of the face that contacts the image receiving sheet 14, is narrower than the width between the step tapes 13 or between the step portions formed by a groove. As a result, the adhesive roller 12 can uniformly contact the image receiving sheet 14, without contacting the step tape 13 or the recording drum 11, and as a result, dust can effectively be removed from the image receiving sheet 14. More specifically, in order to prevent the portion of the adhesive roller 12 that contacts the image receiving sheet 14 from touching the step tape 13 or the recording drum 11, in accordance with its mechanical size, the adhesive roller 12 must be separated by a distance of 1.5 mm from the inner sides of the step tape 13 or of the groove. Therefore, the adhesive roller 12 is so designed that its width, in the axial direction, is narrower by at least 3 mm than the width of the area defined by the inner sides of the step tape 13 or the width, in the axial direction, of the groove.

While also taking the width of the image receiving sheet 14 into account, to obtain a uniform image it is preferable that the width, in the axial direction, of the adhesive roller 12 be greater than the width, in the axial direction, of the image receiving sheet 14. Therefore, the adhesive roller 12 is so designed that its width, in the axial direction, is narrower by at least 3 mm than the width of the area defined by the inner sides of the step tape 13 or the width, in the axial direction, of the groove, and is greater than the width, in the axial direction, of the image receiving sheet 14.

It is also substantially effective if the width, in the axial direction, of the adhesive roller 12 is essentially equal to the width, in the axial direction, of the recording range. Preferably, the width, in the axial direction, of the adhesive roller 12 is greater than the width, in the axial direction, of the recording range, and is narrower than the width between the step portions in the axial direction.

As is described above, the thus structured adhesive roller of the recording apparatus of this invention can effectively remove dust from an image receiving sheet 14 that is secured to the recording drum 11. The adhesive roller 12 can also be used when an image receiving sheet 14 is not present on the recording drum 11 (before it is fed, or after it has been discharged), and can remove dust from the portion of the recording drum 11 to which an image receiving sheet 14 is secured.

Figure 8:
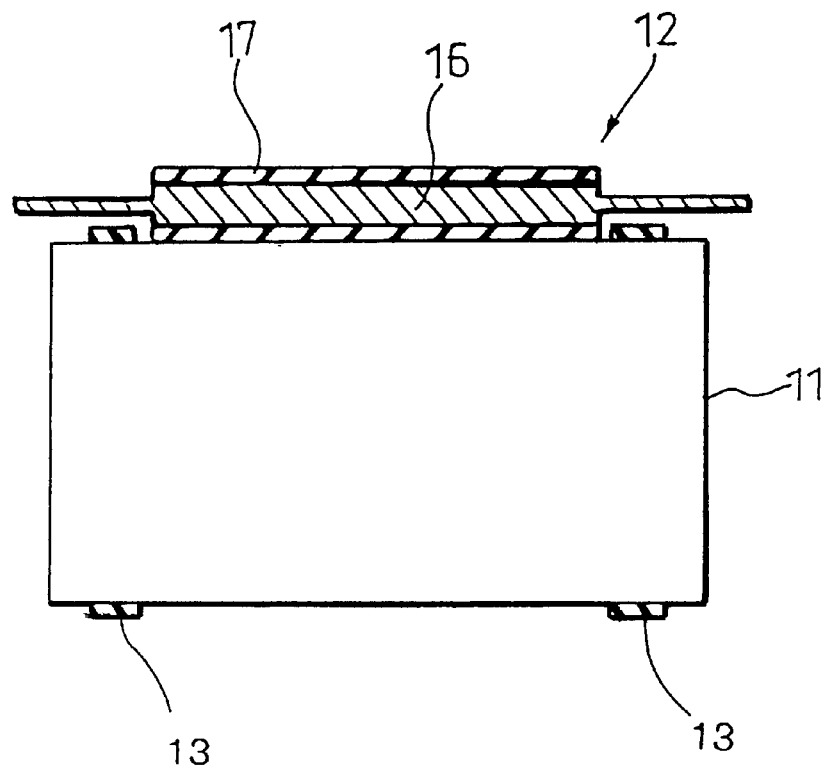
FIG. 8 is a front cross-sectional view of a recording apparatus, for which step tape is used, that includes the first example adhesive roller according to the second embodiment of the present invention.
Figure 9:
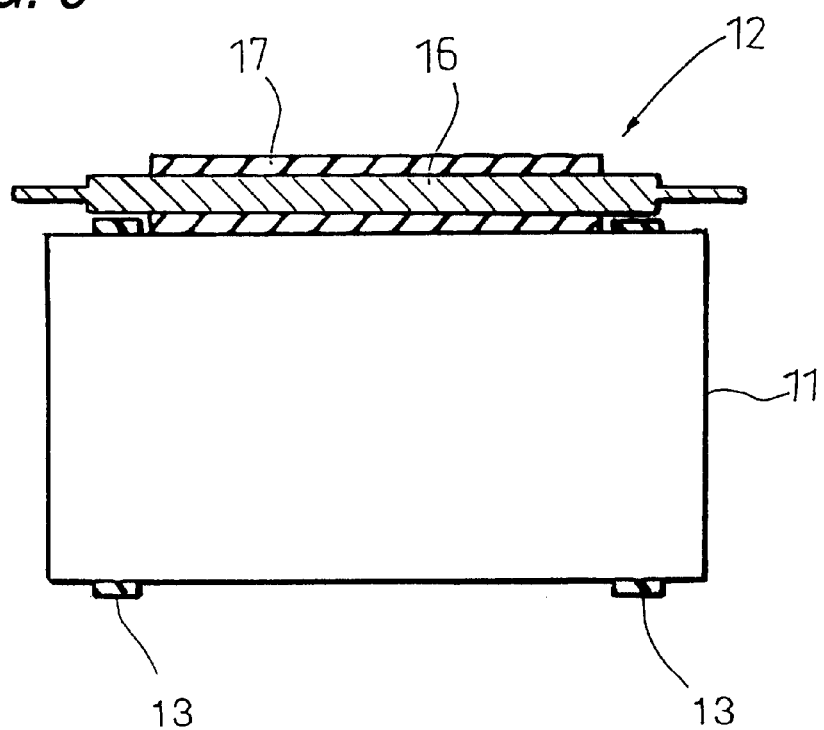
FIG. 9 is a front cross-sectional view of the recording apparatus, for which step tape is used, that includes the second example adhesive roller according to the second embodiment of the present invention.
Figure 10:
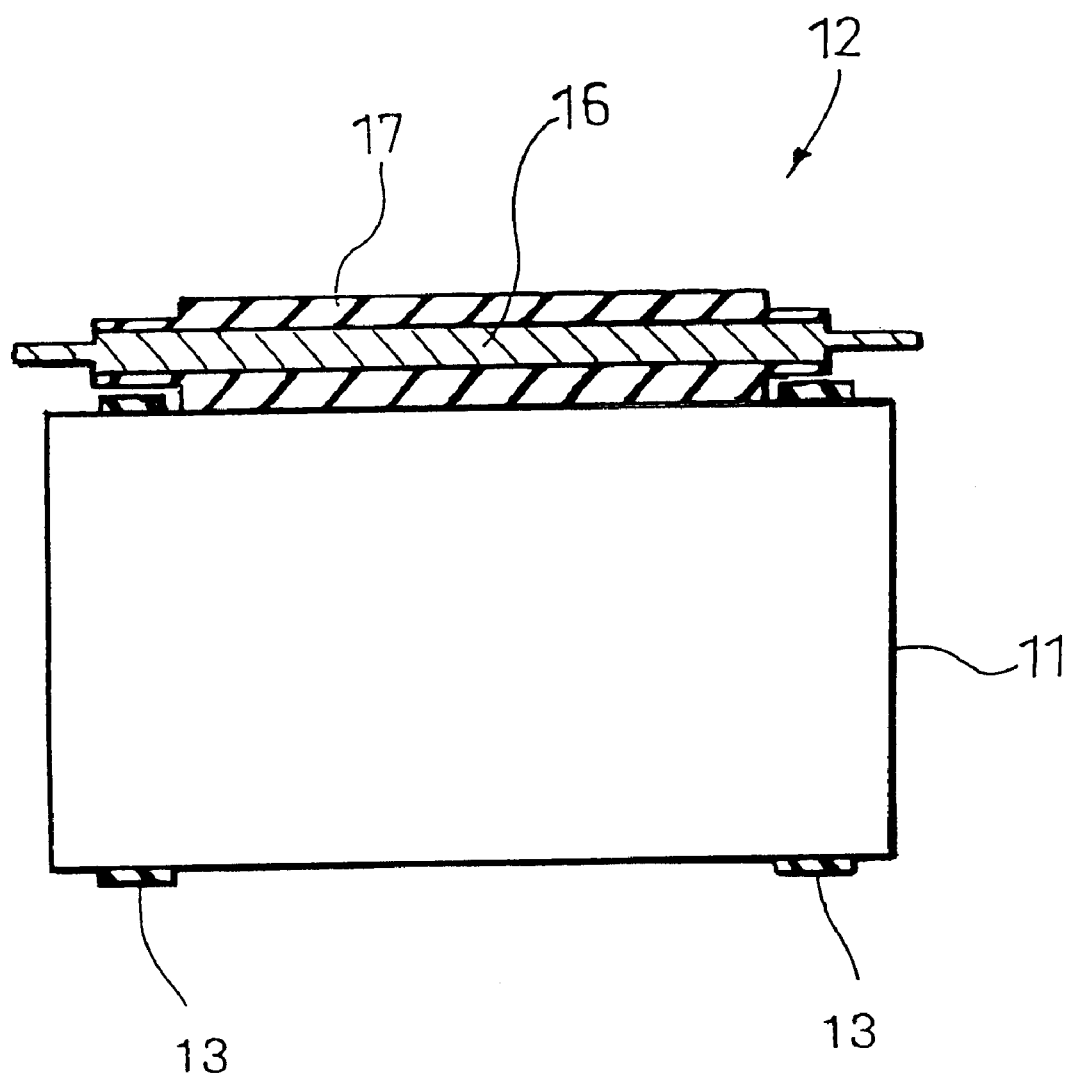
FIG. 10 is a front cross-sectional view of the recording apparatus, for which step tape is used, that includes the third example adhesive roller according to the second embodiment of the present invention.
Figure 11A:
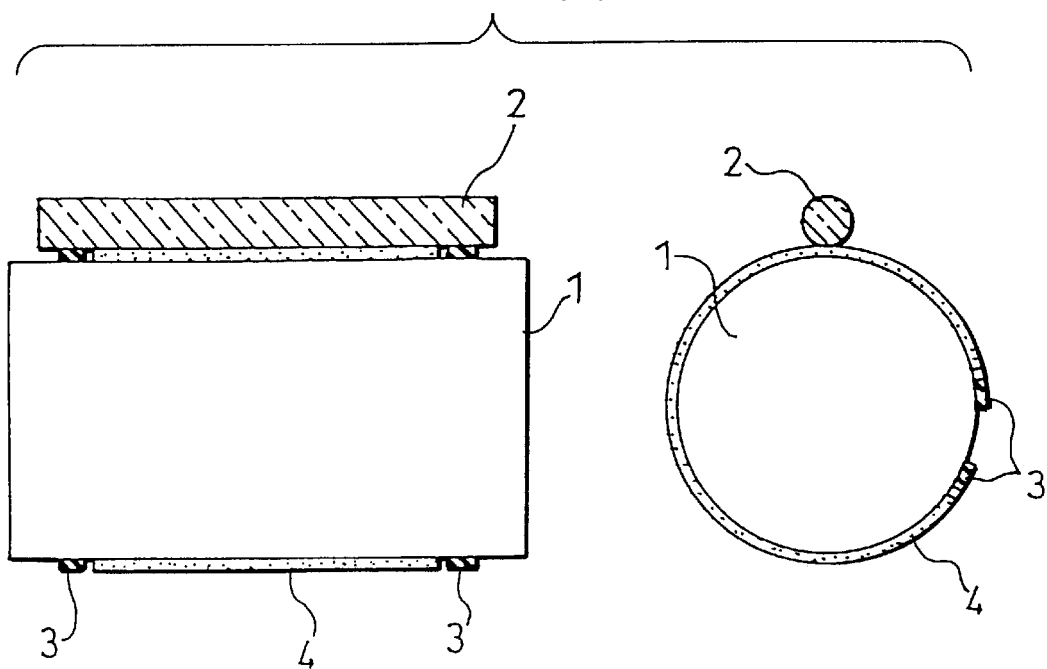
FIGS. 11(a) and 11(b) are a front cross-sectional view and a side-sectional view of a conventional recording drum for which step tape is used.
Figure 11B:
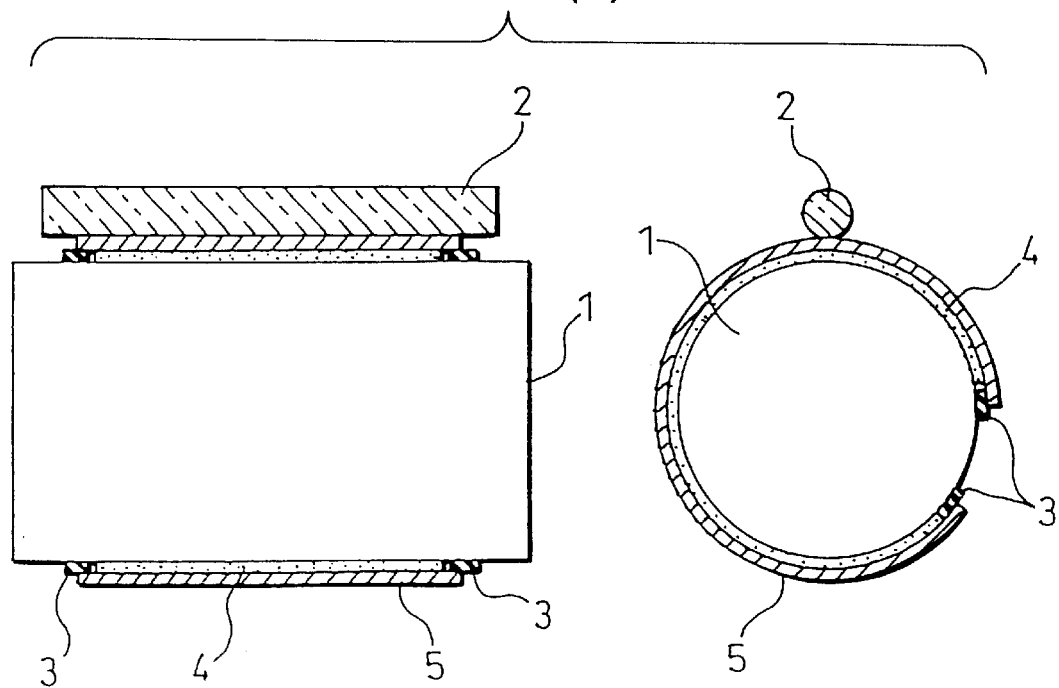
Figure 12A:
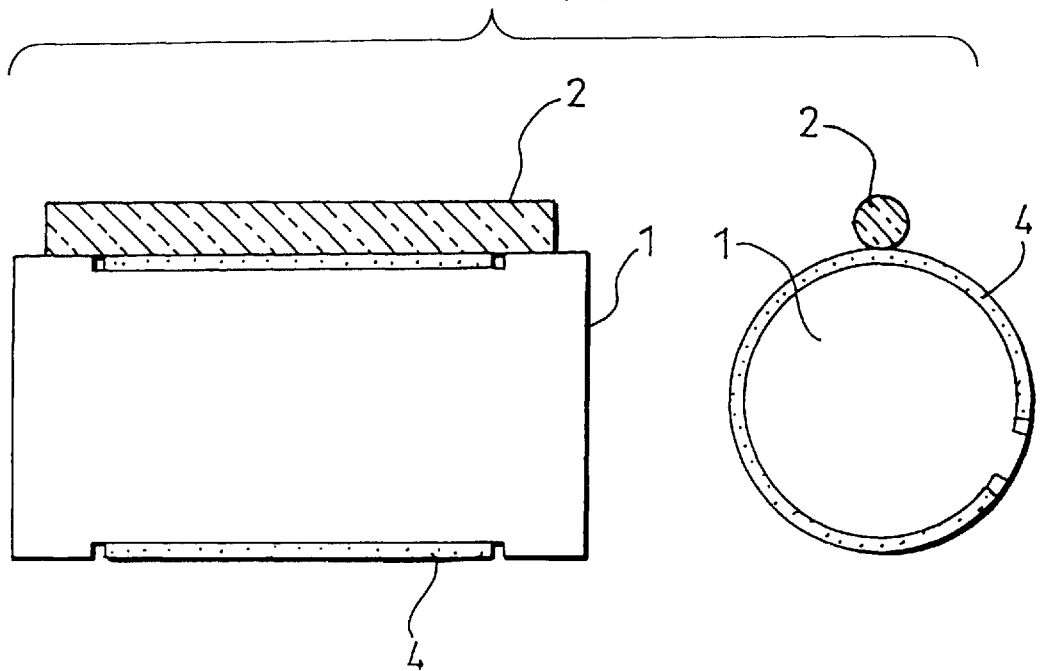
FIGS. 12(a) and 12(b) are a front cross-sectional view and a side-sectional view of a conventional recording drum for which a groove is used.
Figure 12B:
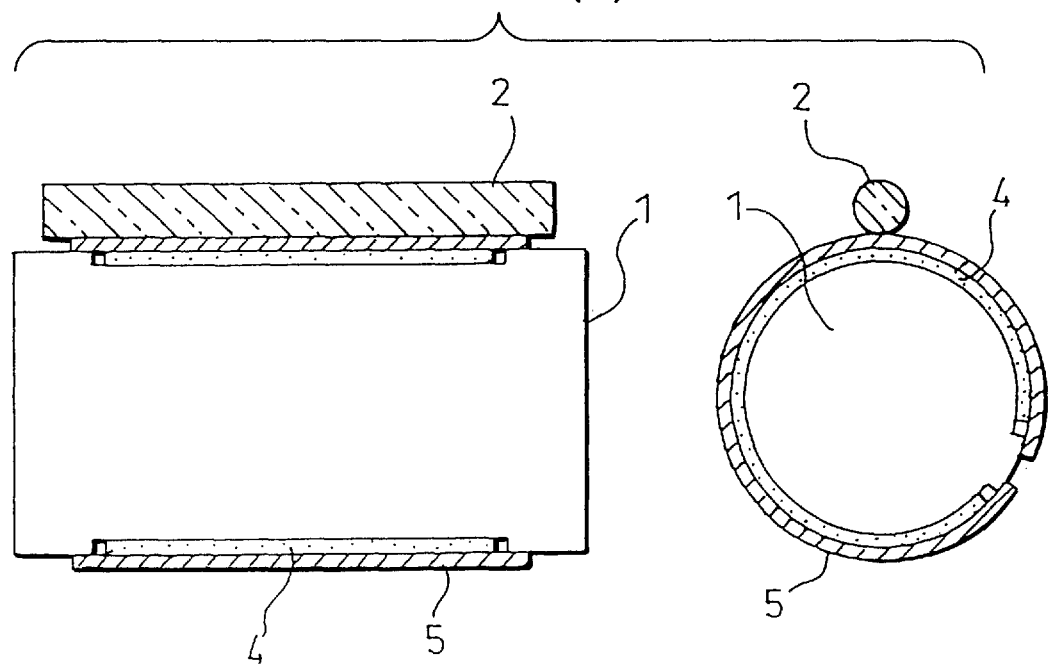
Figure 13:
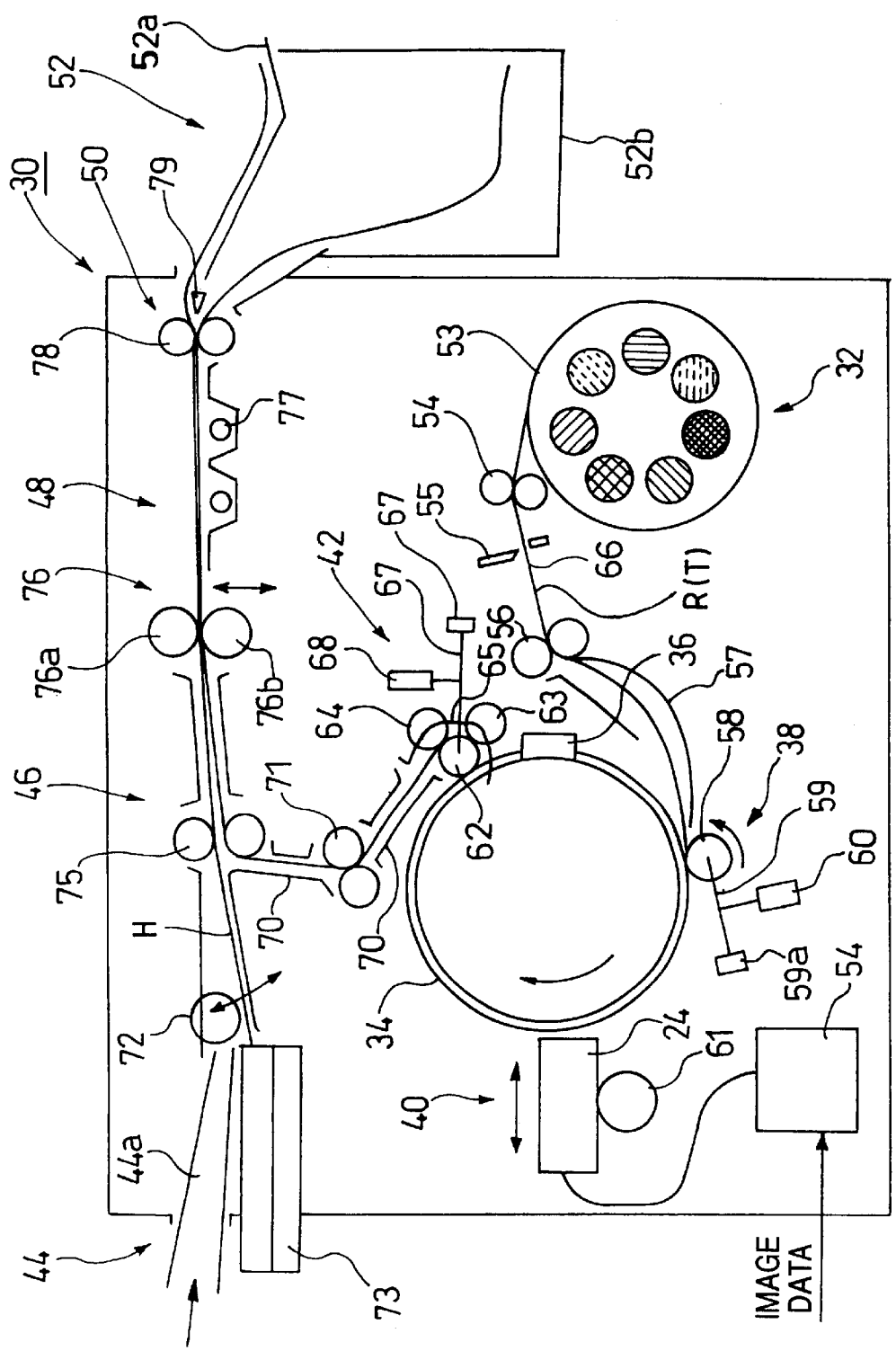
FIG. 13 is a conceptual diagram illustrating a recording apparatus used for the present invention.

A second embodiment of the present invention is illustrated in FIGS. 8 to 10. FIG. 8 is a front cross-sectional view of a case wherein a recording drum 11 is cleaned by using the first example adhesive roller 12 (corresponding to FIGS. 2 and 5) for the first embodiment of the present invention. FIG. 9 is a front cross-sectional view of a case wherein the recording drum 11 is cleaned by using the second example adhesive roller 12 (corresponding to FIGS. 3 and 6) for the first embodiment of the present invention. FIG. 10 is a front cross-sectional view of a case wherein the recording drum 11 is cleaned by using the third example adhesive roller 12 (corresponding to FIGS. 4 and 7) for the first embodiment of the present invention. In FIGS. 8 to 10, the same reference numerals are used to denote corresponding components as are used for the recording drum 11 to which step tape 13 has been attached, in FIGS. 5 to 7.

In FIGS. 8 to 10, the surface of the recording drum 11, to which is attached step tape 13 to avoid the effect produce by the thickness of an image receiving sheet 14, is cleaned by using the adhesive roller 12 before the image receiving sheet is secured to the recording drum 11. Since the structures of the recording drum 11 in which a groove is formed, and the adhesive roller 12 are the same as those in FIGS. 5 to 7, no further explanation will be given.

The adhesive roller 12 need only clean, at the least, the portion of the surface of the recording drum 11 an image receiving sheet 14 contacts.

If the adhesive power of the adhesive roller 12 is equal to or greater than 8 hecto-pascals, a greater effect can be obtained for these reasons. Specifically, when the adhesive power of the adhesive roller 21 is great, the dust removal effect is increased, but on the other hand, a film coating, such as the image receiving layer of the image receiving sheet 14 or the cushion layer, may also be peeled off. Therefore, the adhesive power of the adhesive roller 12 is determined while taking into account the permissible ranges for A. the dust removal effects, and B) the separation of coated film (the jamming and winding of the recording medium are others).

According to the results obtained by the experiments,

For A. dust removal,
(1) when the adhesive power (hecto-pascal) of the adhesive roller 12 is 0 to less than 8, a recording failure is at an impermissible level;
(2) when the adhesive power is 8 to less than 25, a recording failure is about at a permissible level;
(3) when the adhesive power is 25 to less than 50, a recording failure is at a permissible level; and
(4) when the adhesive power is over 50, a recording failure is at a more than satisfactory permissible level.

For B. separation of coated film,
(1) when the adhesive power (hecto-pascal) of the adhesive roller 12 is 0 to less than 35, a recording medium is transferred stably;
(2) when the adhesive power is 35 to less than 60, a recording medium is transferred at a permissible level, although jamming sometimes occurs during the transfer; and
(3) when the adhesive power is over 60, the transportation level is at an impermissible level because jamming constantly occurs.

It is apparent from the above results that the use of the adhesive roller 12 must be changed as follows in accordance with the adhesive power.
(1) When the adhesive power of the adhesive roller is equal to or greater than 60 hecto-pascals, the adhesive roller can be used only for cleaning the recording drum, and can not be used for a recording medium transfer system.
(2) When the adhesive power of the adhesive roller is 25 to 40, the adhesive roller can be used for cleaning both the recording drum and a recording medium (especially, an image receiving sheet).
(3) When the adhesive power of the adhesive roller is 8 to 20, the adhesive roller can also be for a recording drum transferring system, and can be employed for cleaning both the recording drum and a recording medium (especially, an image receiving sheet).

The adhesive roller 12 having a step portion is employed to correspond with the step portions 13. In this case, the gap, in the axial direction, between the step portions of the adhesive roller 12 is smaller than the gap, in the axial direction, between the step portions 13.

With this arrangement, before the image receiving sheet is fed or after has been discharged, the adhesive roller 12 contacts the portion of the rotating recording drum 11 to which the image receiving sheet 14 is to be secured. By this application of the adhesive roller 12, dust is removed from the portion of the recording drum 11 on which the image receiving sheet is to be secured. Then, an image receiving sheet 14 is fitted around the recording drum 11, and dust on the image receiving sheet 14 is removed by the adhesive roller 12 as was explained for the first example. The image recording process is thereafter performed.

Figure 14A:
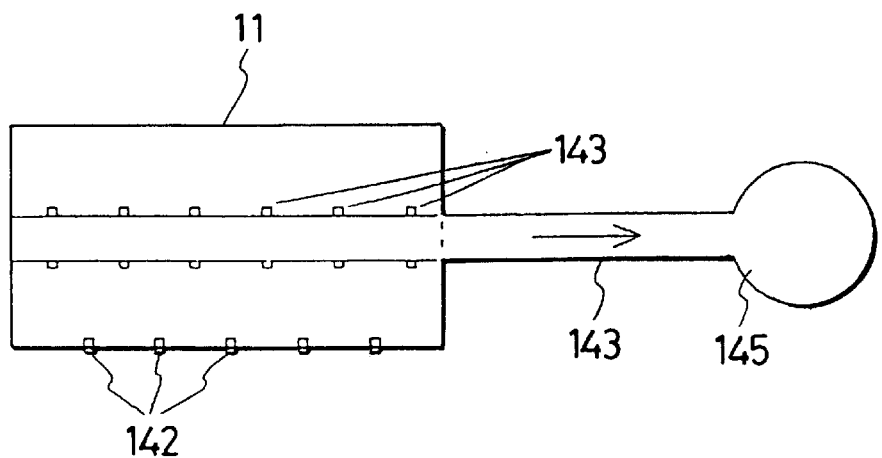
FIGS. 14(a) and 14(b) are diagrams for explaining the principle of a suction device for securing a recording medium.
Figure 14B:
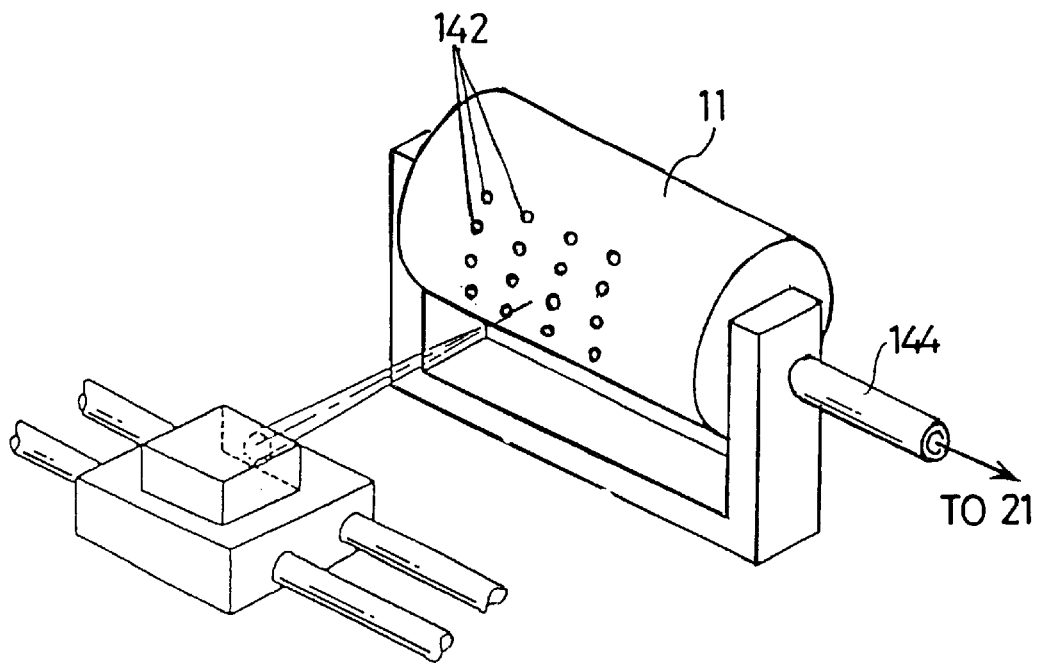
Figure 15:
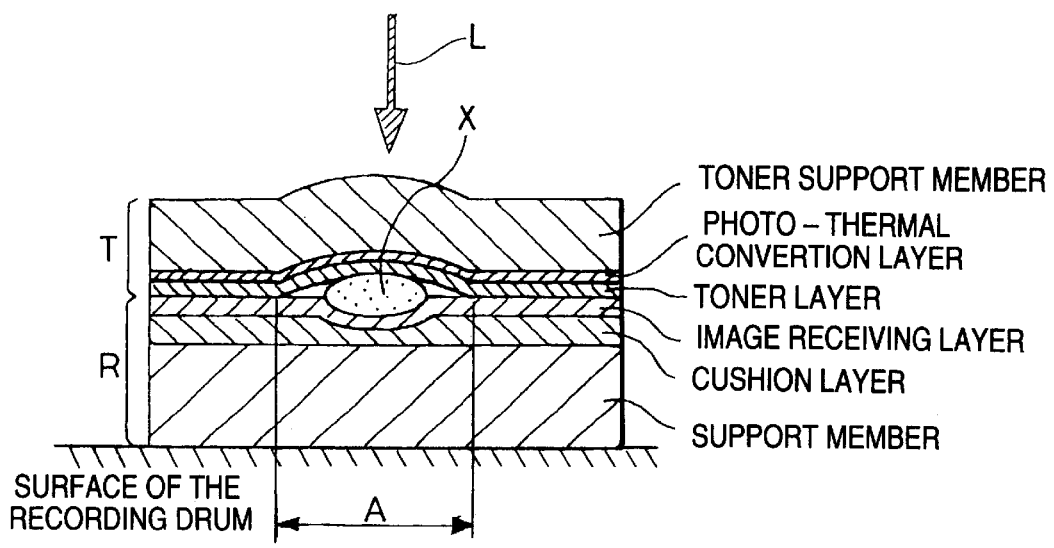
FIG. 15 is a diagram for explaining a problem concerning dust retained on an image receiving sheet.
Figure 16:
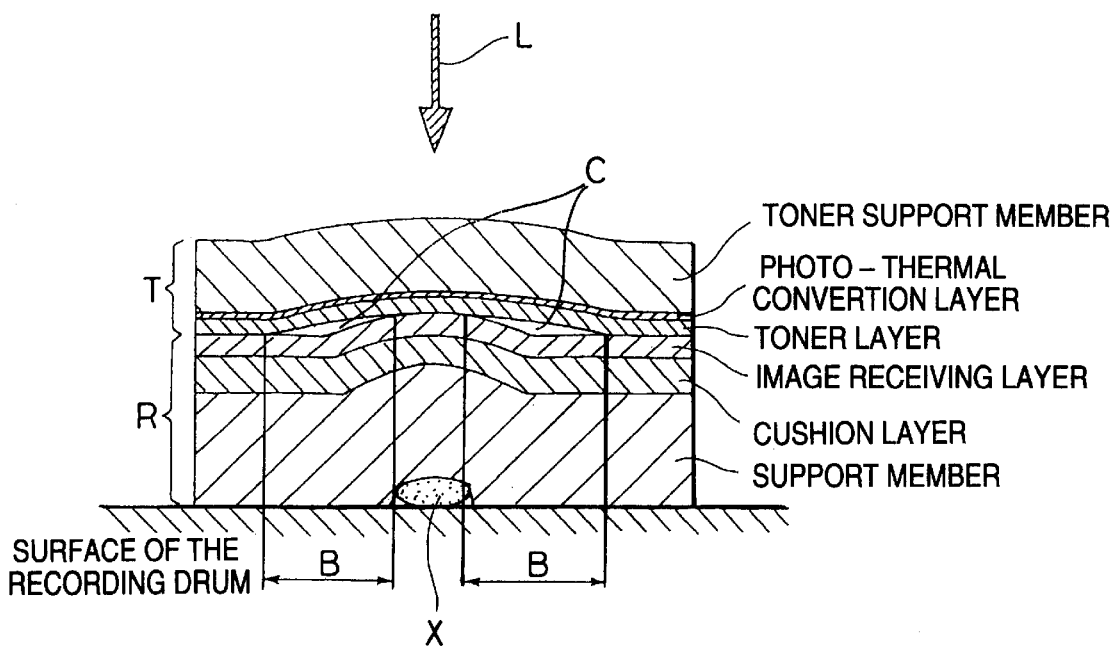
FIG. 16 is a diagram for explaining a problem concerning dust retained on a recording drum.

If the recording apparatus includes a so-called recording medium securing suction device 145 (see FIG. 14) for which, as is described above, multiple holes 142 are formed in the recording drum 11, a greater effect can be obtained when the suction device 145 (air blower) is activated before the adhesive roller 12 cleans the surface of the recording drum 11.

For this process, first, the adhesive roller 12 cleans the surface of the recording drum 11, then the suction device 145 is activated to hold the image receiving sheet 14, and finally the adhesive roller 12 cleans the surface of the image receiving sheet 14.

Or, first, the suction device 145 is activated, and then the adhesive roller 12 cleans the surface of the recording drum 11 and then cleans the surface of the image receiving sheet 14 that is secured to the recording drum 11.

Since the suction device 145 is activated and attracts dust around the recording drum 11, dust in the environment is reduced, and little is attached to the recording drum 11 or to the image receiving sheet 14.

In these embodiments, the same adhesive roller 12 with the step portions is employed as the adhesive roller 12 for cleaning the surface of the recording drum 11, and as the adhesive roller 12 for cleaning the surface of an image receiving sheet 14. However, separate dedicated rollers can be employed.

In the thus arranged recording apparatus of the present invention, the adhesive roller can uniformly contact the image receiving sheet, and can effectively remove foreign substances, such as dust, from the image receiving sheet, so that an image can be obtained that has not been degraded by dust.

Further, when an image receiving sheet 14 is not present on the recording drum (before it is fed or after it has been discharged), the adhesive roller removes foreign substances, such as dust, from the portion of the recording drum on which the image receiving sheet is to be secured, so that adhesive failures occurring between the image receiving sheet and the toner sheet can be prevented, and an image for which no transfer failures occurred can be obtained.

FIG. 17 is a table showing the results of experiments performed with the recording apparatuses of this invention and with conventional recording apparatuses.

The acceleration experiment was conducted in na environment containing a greater than normal amount of dust.

The experimental conditions were as follows.

1. Whether or not the surface of the recording drum should be cleaned.
   1) The surface of the recording drum was not cleaned (conventional).
   2) The surface of the recording drum was cleaned (second embodiment of the invention).
      a. an adhesive roller having no step portions was employed for cleaning.
      b. an adhesive roller having step portions was employed for cleaning.
2. Whether or not vacuum suction should be performed during cleaning.
3. Whether or not the surface of an image receiving sheet should be cleaned.

As the results, (1) Comparison A is an example wherein recording was performed while neither the surface of the recording drum nor the surface of the image receiving sheet was cleaned, and no vacuum suction was performed. A total of 26 ring-like unevenly recorded areas appeared on an A2 sized sheet, and 25 blank areas were found.

(2) Comparison B is an example wherein the surface of the image receiving sheet was cleaned by an adhesive roller having no step portions, while cleaning of the recording drum and the vacuum suction were not performed. A total of 25 ring-like unevenly recorded areas were found and 11 blank areas appeared.

(3) Embodiment A, according to the present invention for cleaning the surfaces of the recording drum and the image receiving sheet, is an example wherein the surfaces of the recording drum and the image receiving sheet were cleaned by an adhesive roller having no step portions, and vacuum suction was not performed.

A total of 20 unevenly recorded areas appeared and 9 blank areas were found. The reduction in the blank areas to less than 10 was rated highly.

(4) Embodiment B is an example wherein the surfaces of the recording drum and the image receiving sheet were cleaned by an adhesive roller having step portions, and vacuum suction was not performed.

A total of 7 unevenly recorded areas appeared and 6 blank areas were found. The reduction in both unevenly recorded areas and blank areas to less than 10 was rated highly.

(5) Embodiment C is an example wherein the surfaces of the recording drum and the image receiving sheet were cleaned by an adhesive roller having step portions, and vacuum suction was performed.

A total of 5 unevenly recorded areas appeared and 4 blank areas were found. The reduction in both the unevenly recorded areas and the blank areas to counts that were equal to or smaller than 5 was rated highly.

As a result, it was determined that apparently it is important (1) to clean the surface of the recording drum having step portions (claim 1) and (2) to employ an adhesive roller having a step portion (claims 4 and 9).

Further, it was apparent that the employment of vacuum suction provided a more effective process (claim 6).

The rotary recording drum has been described; however, the present invention is not limited to this drum, and can be applied for a recording apparatus wherein an image receiving sheet is secured to a flat recording face (claim 18).

As is described above, according to the recording apparatus of the present invention, the adhesive roller can precisely contact the recording drum and the image receiving sheet and dust can be removed. Therefore, adhesion failures involving image receiving sheets and toner sheets can be prevented, and recording failures due to dust can be reduced.

What is claimed is:

1. A recording apparatus comprising:
   a recording drum, to which an image receiving sheet can be fixed;
   a recording head;
   a step portion, which is provided for said recording drum to avoid an effect produced by the thickness of said image receiving sheet; and
   an adhesive roller for cleaning the surface of said recording drum.

2. A recording apparatus according to claim 1, wherein said adhesive roller is arranged so as to clean the surface area of said drum that said image receiving sheet contacts.

3. A recording apparatus according to claim 1, wherein the strength of the adhesive force exerted by said adhesive roller is equal to or greater than 8 hecto-pascals.

4. A recording apparatus according to claim 1, wherein provided for said adhesive roller is a step portion that corresponds to said step portion on said recording drum.

5. A recording apparatus according to claim 4, wherein a gap at said step portion in the axial direction of said adhesive roller is smaller than a gap at said step portion on said recording drum.

6. A recording apparatus according to one of claims 1 to 5, further comprising:
   a suction device for attracting a recording medium to and holding said recording medium on said recording drum, the suction device having multiple suction holes radially formed in said-recording drum, and said suction device being activated during a time when said adhesive roller cleans the surface of said recording drum.

7. A recording apparatus according to claim 6, wherein said suction device is controlled so that the suction device is activated after said adhesive roller has cleaned the surface of said recording drum, and then said image receiving sheet is fixed to said recording drum and said adhesive roller cleans the surface of said image receiving roller.

8. A recording apparatus according to claim 6, wherein said suction device is controlled so that the suction device is activated before said adhesive roller cleans the surface of said recording drum, and then said image receiving sheet is fixed, and said adhesive roller cleans the surface of said image receiving sheet.

9. A recording apparatus according to claim 1, wherein said recording drum constitutes a recording plane.

10. A recording apparatus according to claim 1, wherein said adhesive roller is disposed close to said recording drum.

11. A recording apparatus comprising:
    a recording drum, to which an image receiving sheet is secured;
    a recording head;
    a step portion, which is provided for said recording drum to avoid an effect produced by the thickness of said image receiving sheet; and
    a adhesive roller, which has a step portion and which is located near said recording drum, for cleaning the surface of said image receiving sheet that is secured to said recording drum.

12. A recording apparatus according to claim 11, wherein the width, in the axial direction, of the face of said adhesive roller that contacts said image receiving sheet is substantially equal to the width, in the axial direction, of said image receiving sheet.

13. A recording apparatus according to claim 11, wherein the width, in the axial direction, of said face of said adhesive roller that contacts said image receiving sheet is smaller narrower the width, in the axial direction, of said gap at said step portion in said recording drum.

14. A recording apparatus according to claim 13, wherein the width, in the axial direction, of said face of said adhesive roller that contacts said image receiving sheet is narrower by at least 3 mm than the width, in the axial direction, of said gap at said step portion in said recording drum.

15. A recording apparatus according to claim 13, wherein the width, in the axial direction, of said face of said adhesive roller that contacts said image receiving sheet is narrower by at least 3 mm than the width, in said axial direction, of said gap, in the axial direction, at said step portion in said recording drum, and is wider, in the axial direction, than the width, in the axial direction, of said image receiving sheet.

16. A recording apparatus according to claim 11, wherein the width, in the axial direction, of said face of said adhesive roller that contacts said image receiving sheet is substantially equal to the width, in the axial direction, of the recording range for said image receiving sheet.

17. A recording apparatus according to claim 13, wherein the width, in the axial direction, of said face of said adhesive roller that contacts said image receiving sheet is narrower than the width, in the axial direction, of said gap at said step portion in said recording drum, and is wider than the width, in the axial direction, of said recording range for said image receiving sheet.

18. A recording apparatus comprising:
   a recording drum, to which an image receiving sheet is secured;
   a recording head;
   a step portion, which is provided for said recording drum to avoid the effect produced by the thickness of said image recording sheet;
   a adhesive roller, which has a step portion and which is located near said recording drum to clean the surface of said recording drum; and
   a adhesive roller, which has a step portion and which is located near said recording drum to clean the surface of said image receiving sheet.

19. A recording apparatus according to claim 18, wherein said adhesive roller used for cleaning said recording drum, and said adhesive roller used for cleaning said image receiving sheet are common.

* * * * *